Figure 1:
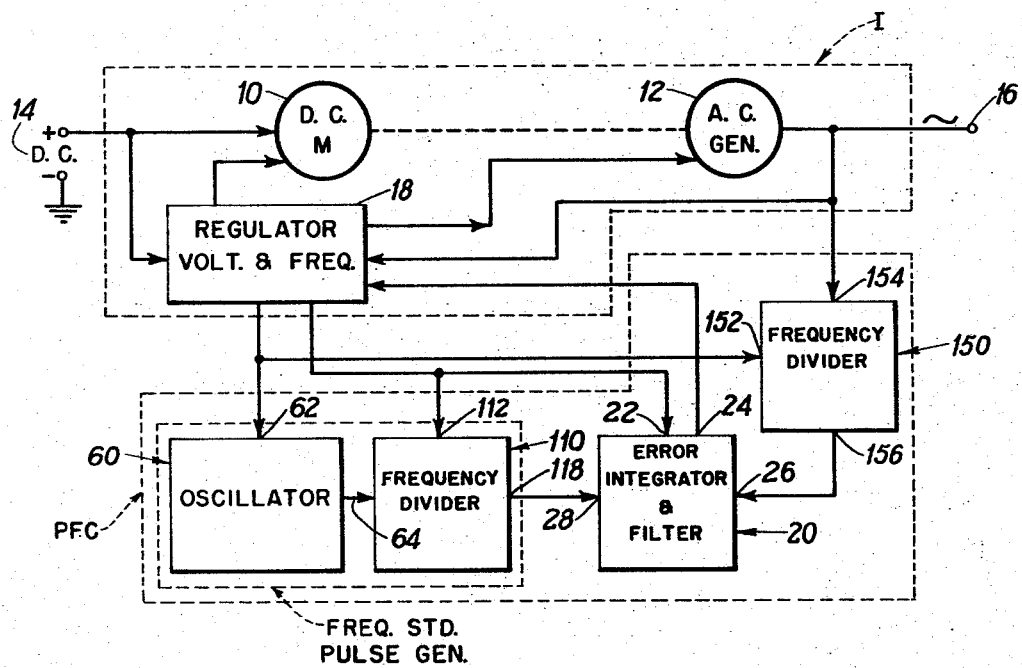

Sept. 26, 1967   T. W. MOORE ET AL   3,344,360
INVERTER FREQUENCY CONTROL
Filed Aug. 23, 1966   2 Sheets-Sheet 1

INVENTORS
THOMAS W. MOORE
DONALD S. FRITZ

Charles J. Worth
AGENT

INVENTORS
THOMAS W. MOORE
DONALD S. FRITZ

Charles J. Worth
AGENT

United States Patent Office 3,344,360
Patented Sept. 26, 1967

3,344,360
INVERTER FREQUENCY CONTROL
Thomas W. Moore, Dayton, and Donald S. Fritz, Xenia, Ohio, assignors to American Machine & Foundry Company, a corporation of New Jersey
Filed Aug. 23, 1966, Ser. No. 574,456
9 Claims. (Cl. 331—8)

This invention relates generally to frequency control of an A.C. output and more particularly to means to precisely control the rotational speed of a motor driven A.C. generator or an inverter to control the frequency of the resulting A.C. output.

Precision frequency control devices are generally costly and complex, and are used in relatively small quantities. Thus, a modicum of inaccuracy is normally tolerated as an arbitrary solution.

A device made in accordance with the present invention is primarily intended as an add-on, to a standard machine with its own control, to convert such a machine to a precision slaved unit with substantially no modification of the original package being required.

An object of the present invention is to provide an improved precision frequency control of an A.C. output.

Another object of the present invention is to provide the foregoing control having substantially no start-up lag so that precision frequency control is immediately available when a motor driven A.C. generator or inverter comes up to normal operating speed after start-up.

And another object of the present invention is to provide the foregoing control as an add-on to a standard machine.

The present invention contemplates apparatus, in combination with an inverter having a regulator therefor, apparatus for providing error compensating signals to control the frequency of the inverter A.C. output, comprising an error integrator and filter means having a first signal input to receive pulses at a rate representing the frequency of the inverter A.C. output, a second signal input to receive frequency standard pulses, and a controlled output adapted for connection to the inverter regulator, and being responsive to pulses received alternately at its first and second signal inputs for providing positive D.C. integrated frequency error signals at its output; means connected to the inverter and to the first signal input for sampling the inverter A.C. output and providing pulses to the integrator and filter means at a rate representing the frequency of the sensed A.C. output; a precision oscillator, and frequency divider means connected to the oscillator together generating frequency standard pulses; and oscillator including a vibrating member means driven at resonance to establish a frequency signal, a driver-output means, including accelerator means, providing output pulses at a rate corresponding to the frequency of the established signal, and a feedback loop connecting the driver-output means to the input of the vibrating member means to latch the vibrating member means to the driver-output means; and said frequency divider means being connected to the driver-output means and responsive to pulses therefrom, having capacitance means charged by pulses in response to pulses from the driver-output means, and having a controlled output responsive to the charged capacitance and connected to the second signal input for transmitting a frequency standard pulse to the integrator and filter means each time the capacitance means is charged by a predetermined number of pulses.

The foregoing and other objects and advantages will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 2:
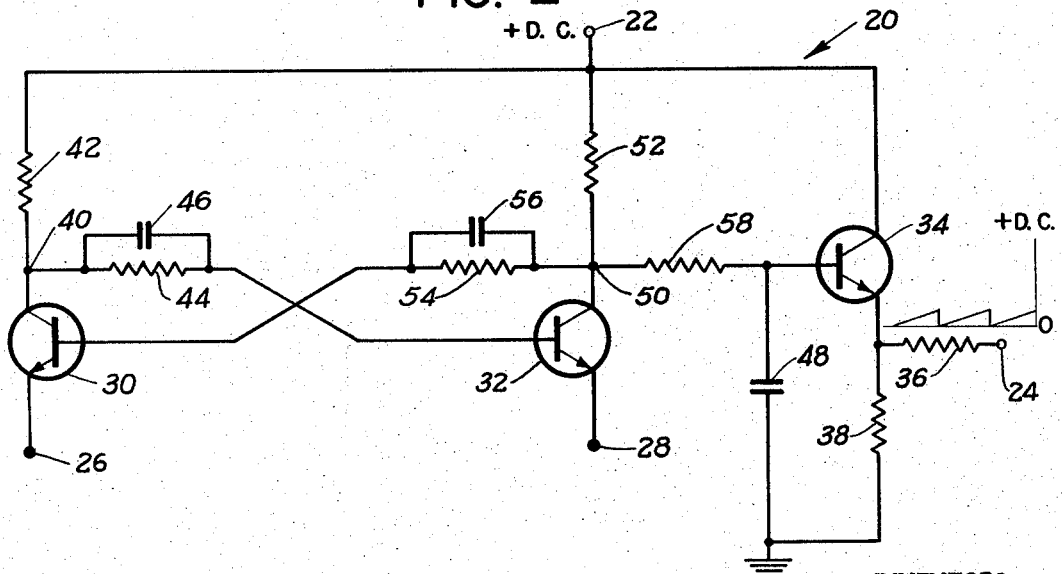
Figure 3:
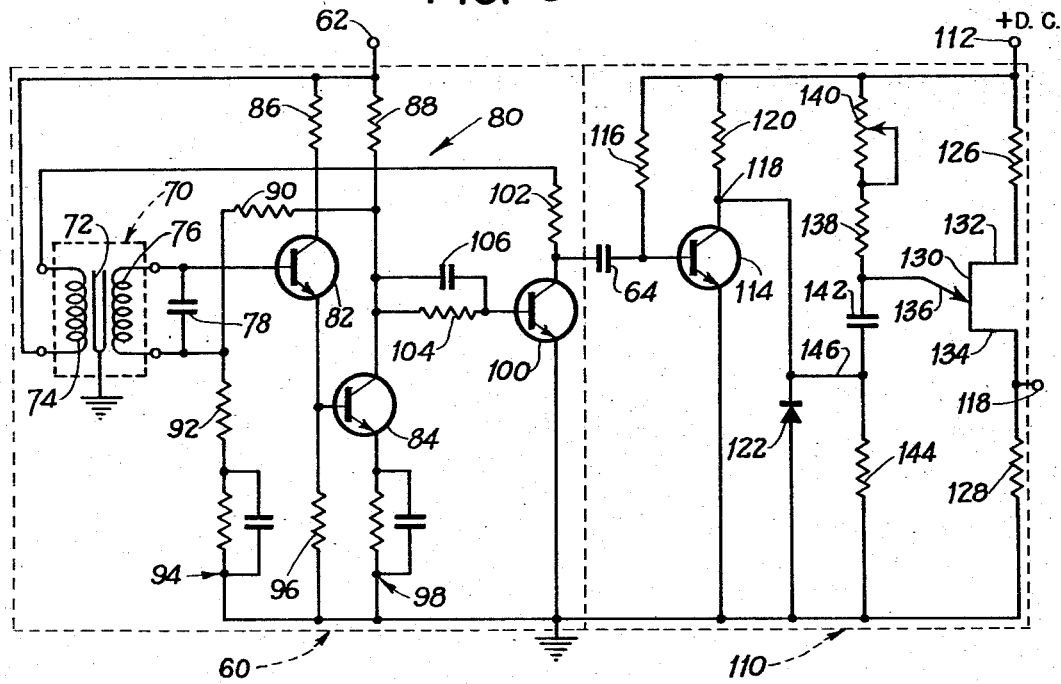
Figure 4:
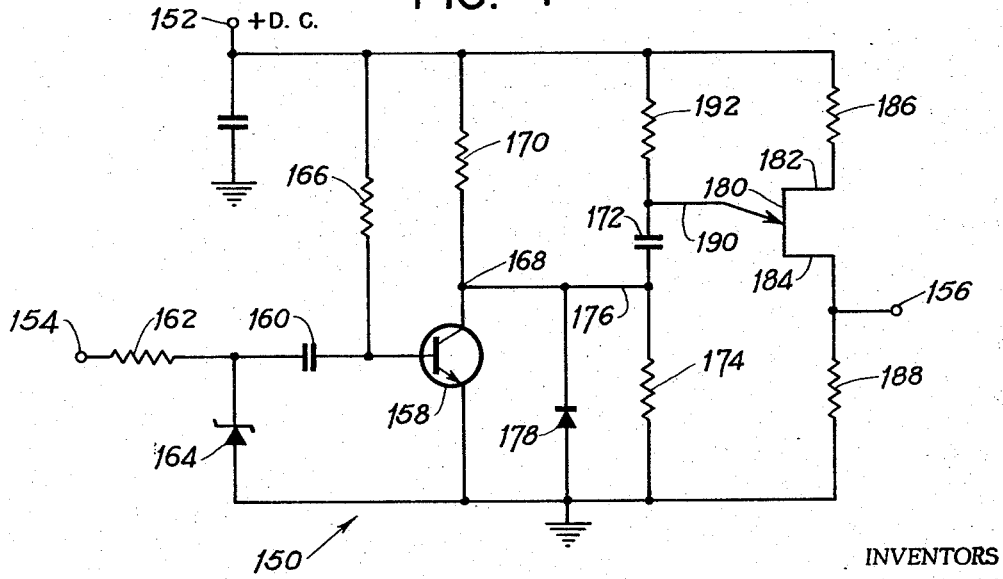

FIGURE 1 is a block diagram of a standard controlled motor/A.C. generator with a precision frequency control made in accordance with the present invention, and FIGURES 2, 3 and 4 are circuit diagrams of an error integrator and filter network, a frequency standard pulse generator, and a sensed pulse count-down or frequency divider, respectively, of the novel precision frequency control of FIGURE 1.

Referring now to the drawings and particularly to FIGURE 1, an inverter 1 comprises a D.C. motor 10 mechanically connected to drive an A.C. generator 12. Motor 10 is connected to a D.C. source 14, and generator 12 has an output terminal 16 for its A.C. signal, as shown.

A voltage and frequency regulator 18, connected to the D.C. source 14, is connected to provide field current to each the motor 10 and generator 12. Regulator 18 also has a connection to sense the A.C. output of generator 12 to produce an output signal to modulate the field current provided to motor 10. The modulated field current controls the speed of motor 10, thus controlling the frequency of the A.C. output of generator 12.

This, in brief, comprises the standard controlled motor/A.C. generator or inverter package.

The novel precision frequency control PFC, made in accordance with the present invention has an error integrator and filter network 20 in the form of a bistable multivibrator or flip-flop and is used as an over-ride device on the regulator 18. The network 20 requires no initial phase shift means and incorporates no frequency rate sensor.

In essence, pulses representing the frequency of the A.C. output of generator 12 set the flip-flop network 20 which is reset by pulses representing a desired frequency standard to provide a positive D.C. signal having its amplitude progressively increasing with time between set and reset, or, is a function of the integrated phase error.

The output signal of network 20 is superimposed on the reference signal of regulator 20 to falsify its reference value and, although the output signal is unidirectional in value, it acts bidirectionally depending upon whether its amplitude exceeds or is less than the amplitude of the reference signal.

The error integrator and filter network 20 may be more fully understood by reference to FIGURE 2. As shown, network 20 has an input terminal 22 for receiving controlled positive D.C. operating voltage, which for illustrative purposes is +12 volts D.C. an output terminal 24 which is connected to the standard regulator 18, and a pair of signal input terminals 26 and 28 for receiving pulses representing the frequency of the A.C. output of generator 12 and a desired frequency standard, respectively.

A pair of control transistors 30 and 32 are provided with the emitters thereof connected to signal input terminals 26 and 28, respectively, to control conduction of an output transistor 34 having its collector connected to the controlled D.C. input terminal 22 and its emitter connected to the signal output terminal 24 and to ground by resistors 36 and 38 forming a divider network.

The collector of transistor 30 has a common junction 40 connected to the controlled D.C. input 22 by a resistor 42 and to the base of transistor 32 by a resistor 44 and a capacitor 46 coupled in parallel with one another. Similarly, the collector of transistor 32 has a common junction 50 connected to the controlled D.C. input by a resistor 52 and to the base of transistor 30 by a resistor 54 and a capacitor 56 coupled in parallel with one another.

It should be noted that the connection of the controlled D.C. input 22 is common to resistors 42 and 52 and to the collector of the output transistor 34. The base of output transistor 34 is connected to the common junction 50 by a resistor 58 and to ground by a capacitor 48 which form an R.C. network controlling the rise rate of the output signal at terminal 24.

It now should be readily understood that the error integrator and filter network is a conventional solid state bistable multivibrator with an output transistor having an R.C. network coupled thereto.

The frequency standard pulse generator should properly be considered as having two individual networks each cooperating with the other to provide frequency standard pulses at a desired predetermined frequency to input terminal 28 to reset network 20. As shown in FIGURE 1 and indicated in FIGURE 3, the frequency standard pulse generator is comprised of a precision oscillator 60 for generating pulses at a precise predetermined frequency, and a count-down or frequency divider 110 for receiving the pulses from oscillator 60 and in response thereto providing frequency standard pulses at a desired reduced rate to signal input 28 of the error integrator and filter 20.

Referring now to FIGURE 3, oscillator 60 has an input terminal 62 to receive controlled positive D.C. voltage as does input terminal 22 of network 20. As shown in FIGURE 1, both terminals 22 and 62 are connected to regulator 18 and receive the controlled voltage from a Zener source therein. A commercially available precision resonator 70 is provided together with an amplifier-driver 80 to form the oscillator 60. Resonator 70, for illustration purposes may be a model MZ-1600-J2 resonator manufactured by Philamon Laboratories, Inc.

The illustrative resonator has a vibrating reed or tuning fork 72, a primary or driving coil 74 which when energized causes fork 72 to vibrate at its resonant frequency which is 1600 c.p.s. in this instance, and a secondary or output coil 76 with a capacitor 78 connected across its ends to provide an output A.C. signal in response to vibration of fork 72.

Amplifier-driver 80 is basically comprised of cascaded transistors. As shown, the controlled voltage input is connected to the lower end of the primary coil 74. A pair of transistors 82 and 84, functioning as an emitter-follower and a feedback amplifier, are collector connected between the input 62 and the lower end of coil 74 by resistors 86 and 88, respectively. As shown, the upper end of coil 76 is base connected to control transistor 82. The lower end of coil 76 is connected between the collector of transistor 84 and resistor 88 by a resistor 90, and to ground by a resistor 92 connected in series with a parallel R.C. network 94.

The emitter of transistor 82 is connected to the base of transistor 84, and to ground by a resistor 96. The emitter of transistor 84 is also connected to ground, in this instance, by a parallel R.C. network 98. The amplifier-driver 80 has a third or output transistor 100. The emitter of transistor 100 is connected to ground while its collector is connected to the frequency divider 110 by a capacitive output 64 and to the upper end of coil 74 by a resistor 102, as shown.

The use of the emitter-follower 82 and degenerative feedback circuit collector connected to transistor 84 provide for a high value of effective impedance to the amplifier, and makes overall oscillator performance substantially independent of variations in transistor parameters. The high input impedance minimizes the load on the tuning fork to maintain the resulting high resonant gain upon which frequency stability depends.

It now should be readily understood that amplifier-driver 80 also includes feedback loop to resonator 70 which is a frequency stabilizer to slave, to the resonator, the output transistor 100 which provides an output signal, in this instance, of 1600 pulses per second to the capacitance output 64.

Inasmuch as the frequency standard pulse generator PFG is to have substantially no start-up lag and be operative when the motor driven/A.C. generator or inverter I reaches normal operating speed, with the resonator 70 no time delays or other warm-up provisions are permitted. Coincidently, to provide rapid response by transistor 100, its base is connected between the collector of transistor 84 and resistor 88 by a parallel R.C. network formed by resistor 104 and capacitor 106 which, with no emitter impedances, permits transistor 100 to provide high energy pulses each of relatively short duration. Under steady state operation, bias capacitor 106 and the capacitors of R.C. networks 94 and 98 assume average values such that only minor current pulses are supplied through resistor 102 which are enough to offset loss and maintain normal tuning fork amplitude.

Conventional count-down circuitry involves, for example, an input pulse shaper, three binary dividers each having a 2:1 input to output ratio, an output pulse shaper and an emitter-follower amplifier for a total of approximately one hundred and sixty components. The novel count-down or frequency divider 110 of FIGURE 3 accomplishes all objectives with an order of magnitude reduction of approximately 10:1 in the total number of components. Therefore, the frequency divider 110, as will be described, provides a rapidly responsive network of relatively simple and reliable construction which is compatible with the oscillator 60, and the error integrator and filter 20.

As shown in FIGURE 3, the frequency divider 110 has an input terminal 112 connected to regulator 18, see FIGURE 1, to receive positive D.C. operating voltage which, in this instance, is +28 volts. A control transistor 114 is emitter connected to ground and has its base connected to capacitor 64, and to input 112 by a resistor 116. The collector of transistor 114 has a common junction 118 which is connected to input 112 by a resistor 120 and to ground by a blocking diode 122.

A unijunction transistor 130 is provided to control the frequency standard pulse output to the error integrator and filter 20. The unijunction transistor 130 has a base 132 connected to the positive voltage input 112 by a resistor 126 and has its other base 134 connected to the signal output 118 of the frequency standard pulse generator, and to ground by a resistor 128. As shown in FIGURE 1, output 118 is connected to input 28 of network 20.

The emitter 136 of the unijunction transistor 130 is connected to input 112 by a resistor 138 connected in series with a variable resistor 140, and to ground by a capacitor 142 connected in series with a resistor 144. It should be noted that the connection of input 112 is common to all the resistors 116, 120, 126 and 140. A line 146 is connected at one end between junction 118 and diode 122, and at the other end between capacitor 142 and resistor 144.

Each output pulse applied by transistor 100 across capacitor 64 biases transistor 114 generating a pulse at junction 118 which is applied to charge capacitor 142. The charging rate of capacitor 142 is controlled by the variable resistor 140. As should be readily understood, the frequency divider 110 is basically a relaxation oscillator with a unijunction transistor 130 controlling its output.

The unijunction transistor 130 is selected to fire at the peak value of the eighth pulse applied to capacitor 142 to provide one frequency standard pulse to input 28 of network 20. If firing of the unijunction transistor 130 is to take place at the desired time and if operation is to be consistent, the peak value of a pulse addition to the charging curve of the R.C. network (resistors 138, 140 and 144, and capacitor 142) or the charge rate of capacitor 142 must exceed the base of the next following pulse. Accordingly, in this instance, the frequency standard output to the error integrator and filter 20 will be 200 pulses per second, and in operation the standard package will operate at a frequency established by the novel frequency control which will be 400 cycles per second as will be further discussed.

As shown in FIGURE 1 a count-down or frequency divider 150 is provided to receive signals representing the A.C. output of generator 12 and to provide pulse signals at a predetermined reduced rate to the error integrator and filter 20. In this instance the desired A.C. frequency of the output of generator 12 is 400 cycles per second. Accordingly, the frequency divider 150 must have an input to output ratio of 2:1 for compatibility of the frequency standard pulse generator. It should be understood that if the resonator 70 had a harmonic frequency of 3200 cycles per second or if the frequency divider 110 had a 4:1 input to output ratio, the frequency divider 150 would not be required and the sensed A.C. output could be converted to pulse form and applied as pulses to the error integrator and filter 20. It has been found, however, that reducing the rates of the pulses from the frequency standard pulse generator of FIGURE 13 and the frequency divider 150 to provide a longer cycle period, or slower operation, of the error integrator and filter 20 is preferable.

The count-down or frequency divider 150 is more fully shown in FIGURE 4 and is similar to frequency divider 110. An input terminal 152 is connected with input terminal 112 to regulator 18 to receive positive D.C. operating voltage which again is +28 volts. Signal input and output terminals 154 and 156 are connected to receive sensed A.C. output from generator 12, and to input terminal 26 of network 20, respectively.

A transistor 158 is provided, which corresponds to transistor 114, with its emitter connected to ground. The base of transistor 158 is connected by a capacitor 160 in series with a resistor 162 to input 154 to receive the sensed A.C. output of generator 12 which is clipped to appear as a pulse by a Zener diode 164 connected between capacitor 160 and resistor 162, and to ground. It should be understood, although not shown, that generator 12 may have means for generating pulses representing rotational speed which may be received by input 154 instead of the generator A.C. output.

The collector of transistor 158 has a junction 168 corresponding to junction 118, and a pair of resistors 166 and 170 corresponding to the respective resistors 116 and 120 for connecting the base and collector, respectively, to input 152. A capacitor 172, resistor 174, line connection 176 and diode 178 are provided which correspond to capacitor 142, resistor 144, line connection 146 and diode 122, respectively.

A unijunction transistor 180, corresponding to unijunction transistor 130, has one base 182 connected to input 152 by a resistor 186 and its other base 184 connected to output 156, and to ground by a resistor 188. The emitter 190 of unijunction transistor 180 is connected to input 152 by a resistor 194 corresponding to resistor 138. A resistor corresponding to variable resistor 140 is not used in this instance.

It should be readily understood that frequency dividers 110 and 150 are substantially the same but with selective parameters. Thus, unijunction transistor 180 is selected to fire at the peak of each second pulse applied to capacitor 172.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

We claim:

1. In combination with an inverter having a regulator therefor, apparatus for providing error compensating signals to control the frequency of the inverter A.C. output, comprising:

an error integrator and filter means having a first signal input to receive pulses at a rate representing the frequency of the inverter A.C. output, and a second signal input to receive frequency standard pulses;

said integrator and filter means having a controlled output adapted for connection to the inverter regulator, and being responsive to pulses received alternately at its first and second signal inputs for providing positive D.C. integrated frequency error signals at its output;

means connected to the inverter and to the first signal input for sampling the inverter A.C. output and providing pulses to the integrator and filter means at a rate representing the frequency of the sensed A.C. output;

a precision oscillator, and frequency divider means connected to the oscillator together generating frequency standard pulses;

said oscillator including a vibrating member means driven at resonance to establish a frequency signal, a driver-output means providing output pulses at a rate corresponding to the frequency of the established signal, and a feedback loop connecting the driver-output means to the input of the vibrating member means to latch the vibrating member means to the driver-output means;

said driver-output means including accelerator means; and said frequency divider means being connected to the driver-output means and responsive to pulses therefrom, having capacitance means charged by pulses in response to pulses from the driver-output means, and having a controlled output responsive to the charged capacitance and connected to the second signal input for transmitting a frequency standard pulse to the integrator and filter means each time the capacitance means is charged by a predetermined number of pulses.

2. The apparatus in accordance with claim 1 wherein said error integrator and filter means comprises:

a bistable multivibrator which is set in response to each pulse representing the frequency of the inverter A.C. output, and is reset in response to each frequency standard pulse;

a transistor having its emitter connected to the output of the integrator and filter means, and its base connected to the multivibrator and controlled thereby to transmit a positive D.C. signal each time the multivibrator is set; and an R.C. network coupled to the transistor base and controlling the amplitude of transmitted positive D.C. signals with time to provide integrated frequency error signals.

3. The apparatus in accordance with claim 2, wherein: said driver-output means is a transistor; and said accelerator means is a low impedance emitter connection to ground and a parallel R.C. network base connection of the transistor.

4. The apparatus in accordance with claim 2, wherein said frequency divider means comprises:

a relaxation oscillator storing potential provided by charging pulses in response to pulses from the driver-output means; and a unijunction transistor emitter connected to the relaxation oscillator and responsive to stored potential for transmitting a frequency standard pulse to the integrator and filter means each time the potential stored by the relaxation oscillator is provided by the same predetermined number of charging pulses.

5. The apparatus in accordance with claim 2, wherein said frequency divider means comprises:

an R.C. network providing capacitance means charged by pulses received thereby;

an input transistor being base connected to the driver-output means of the oscillator and collector connected to the R.C. network to tranmit charging pulses to the capacitance means of the network in response to frequency pulses from the driver-output means; and a unijunction transistor emitter connected to the R.C. network and fired by emitter potential in response to the charge of the capacitance means to transmit a frequency standard pulse each time the capacitance means is charged by the same predetermined number of charging pulses.

6. The apparatus in accordance with claim 5, wherein: the R.C. network includes a variable resistor for adjusting the charging rate of the capacitance means.

7. The apparatus in accordance with claim 5, wherein: said driver-output means is a transistor being collector connected to the feedback loop and to the base of the input transistor of the frequency divider means; and said accelerator means is a low impedance emitter connection to ground and a parallel R.C. network base connection of the driver-output transistor.

8. The apparatus in accordance with claim 7, wherein the means connected to the inverter and to the error integrator and filter means comprises:

a relaxation oscillator having an input connected to the inverter to receive the sampled A.C. output therefrom;

means coupled to the relaxation oscillator input to clip the sampled A.C. output to provide control pulses at a rate corresponding to the sampled A.C. output frequency;

said relaxation oscillator being responsive to the control pulses for storing potential provided by charging pulses; and a unijunction transistor emitter connected to the relaxation oscillator and responsive to stored potential for transmitting pulses representing the frequency of the sampled A.C. output, each of the transmitted representative pulses being transmittted when the stored potential is provided by the same predetermined number of charging pulses.

9. The apparatus in accordance with claim 7, wherein the means connected to the inverter and to the error integrator and filter means comprises:

an input to be connected to the inverter to receive the sampled A.C. output;

an R.C. network providing capacitance means charged by pulses received thereby;

an input transistor being collector connected to the R.C. network and providing charging pulses thereto in response to clipped sampled A.C. output from the inverter;

said input transistor having a base connection to receive sampled A.C. output, and a Zener diode coupled to the base connection for clipping the sampled A.C. output; and a unijunction transistor emitter connected to the R.C. network and fired by the emitter potential in response to the charge of the capacitance means to transmit pulses representing the frequency of the sampled A.C. output, each of the transmitted representative pulses being transmitted when the stored potential is provided by the same predetermined number of charging pulses.

References Cited

UNITED STATES PATENTS 2,774,872  12/1956  Howson _____ 331—27.

ROY LAKE, *Primary Examiner.*

J. KOMINSKI, *Assistant Examiner.*